US008488630B2

(12) United States Patent
Hata

(10) Patent No.: US 8,488,630 B2
(45) Date of Patent: Jul. 16, 2013

(54) TRANSMISSION DEVICE AND TRANSMITTING METHOD

(75) Inventor: Akihiro Hata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 301 days.

(21) Appl. No.: 13/089,355

(22) Filed: Apr. 19, 2011

(65) Prior Publication Data

US 2011/0268136 A1 Nov. 3, 2011

(30) Foreign Application Priority Data

Apr. 30, 2010 (JP) ................................ 2010-105184

(51) Int. Cl.
*H04L 12/56* (2006.01)

(52) U.S. Cl.
USPC .......................................... 370/474; 370/505

(58) Field of Classification Search
USPC ........................... 370/474–476, 505, 389, 466
See application file for complete search history.

(56) References Cited

U.S. PATENT DOCUMENTS

| | | | | |
|---|---|---|---|---|
| 6,704,326 B2 * | 3/2004 | Russell et al. | ................ | 370/466 |
| 6,819,679 B1 * | 11/2004 | Kerns et al. | ................... | 370/474 |
| 6,961,348 B2 * | 11/2005 | Yu | ................................ | 370/466 |
| 7,830,924 B2 * | 11/2010 | Kawamura et al. | ........... | 370/505 |
| 2003/0079118 A1 * | 4/2003 | Chow | ............................. | 712/300 |
| 2004/0174902 A1 * | 9/2004 | Russell et al. | ................ | 370/466 |
| 2009/0290587 A1 * | 11/2009 | Kobayashi et al. | ........ | 370/395.1 |
| 2011/0051839 A1 * | 3/2011 | Saitoh | .......................... | 375/295 |

FOREIGN PATENT DOCUMENTS

JP 9-305509 A 11/1997

OTHER PUBLICATIONS

W. Simpson, "PPP in HDLC Framing", Dec. 1993 RFC 1549.*

* cited by examiner

*Primary Examiner* — Gary Mui
(74) *Attorney, Agent, or Firm* — Fujitsu Patent Center

(57) ABSTRACT

A transmission device which capsules and decapsules data of a frame and/or a packet includes a decapsuling circuit, wherein the decapsuling circuit includes a bit de-stuff processor configured to perform bit de-stuffing processing on an input data; a byte de-stuff processor configured to perform byte de-stuffing processing on duplicated data of the input data; a check processor configured to perform frame check sequence (FCS) processing on output from the bit de-stuff processor and the byte de-stuff processor; and a mode determination circuit configured to determine a stuffing mode of an opposite transmission device, based on a code conversion result from the bit de-stuff processor and the byte de-stuff processor and the stuffing mode in which the check processor detects the input data with a normal FCS.

9 Claims, 9 Drawing Sheets

TRANSMISSION DEVICE AND TRANSMITTING METHOD

CROSS-REFERENCE TO RELATED APPLICATIONS

This application is based upon and claims the benefit of priority from the prior Japanese Patent Application No. 2010-105184 filed on Apr. 30, 2010, the entire contents of which are incorporated herein by reference.

FIELD

The embodiments discussed herein are related to a transmission device and method.

BACKGROUND

FIG. 9 is a configuration diagram of a network that includes a transmission device that capsules a frame. A frame transmitted and received to and from a terminal device 1500 is coupled to an Ether over Sonet (EOS)/Packet over Sonet (POS) transmission device 1502 through an Ether/Internet Protocol (IP) network 1501. The EOS/POS transmission device 1502 is coupled to a wide area network such as a Synchronous Digital Hierarchy (SDH) network 1503 through an SDH transmission device 1504.

The EOS/POS transmission device 1502, which has an EOS function and a POS function, capsules a frame and/or a packet by General Framing Procedure (GFP) or Link Access Procedure for SDH (LAPS) to store an Ether Frame or an IP Packet in a payload of SDH/Sonet. Although capsuling by the GFP has been practiced generally, there are many devices that support simply the LAPS.

The GFP and the LAPS play a role mainly in reporting a start position and an end position of a frame. The GFP performs processing for detecting the start position of the frame based on a Header Error Check (HEC). The end position of the frame may be detected by a Payload Length Indicator (PLI) in the header. In the LAPS, the start position of the frame is recognized by a code "0x7E." By the code "0x7E" detected after the start position is recognized, the end position of the frame is recognized.

In the LAPS, if the code "0x7E" is included in a payload, the frame end position may not be detected accurately. Therefore, if the code "0x7E" is included in the payload, the code is preferably converted into another code. For example, there is a device that employs a method of inserting 0 (bit stuffing) if 5 bits of 1 are in succession in data of the payload. For example, there is a device that employs a method of converting (byte stuffing) to code into "0x7D, 0x5E" if the code"0x7E" is detected. (0x7E is indicated as "01111110" in binary, so that 6 bits of 1 are in succession, and the code is converted into another code by bit stuffing most of the time if not always). The technique disclosed in Japanese Laid-open Patent Publication No. 09-305509 includes a format converting circuit that converts bit stuffing data (for example, High-Level Data Link Control (HDLC) framing data) data into byte stuffing data as byte-circuit data.

SUMMARY

According to an aspect of the invention, a transmission device which capsules and decapsules data of a frame and/or a packet includes a decapsuling circuit, wherein the decapsuling circuit includes a bit de-stuff processor configured to perform bit de-stuffing processing on an input data; a byte de-stuff processor configured to perform byte de-stuffing processing on duplicated data of the input data; a check processor configured to perform frame check sequence (FCS) processing on output from the bit de-stuff processor and the byte de-stuff processor; and a mode determination circuit configured to determine a stuffing mode of an opposite transmission device, based on a code conversion result from the bit de-stuff processor and the byte de-stuff processor and the stuffing mode in which the check processor detects the input data with a normal FCS.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described below in detail with reference to the attached diagrams. The disclosed technique is applicable to, for example, a transmission device that includes an EOS function and a POS function. To perform decapsuling processing of data (a frame and/or a packet) to be input from an opposite device during negotiation with the opposite device, the input data is duplicated, and bit de-stuffing processing and byte de-stuffing processing are performed in parallel. Frame Check Sequence (FCS) processing is performed on each output. From among the frames and/or packets in which code conversion is performed by the de-stuffing, a stuffing mode on the side where a normal FCS is detected is determined to be the stuffing mode of the transmission device on the opposite side, and the data is received normally even if the stuffing mode of the opposite device is unknown.

Figure 1:
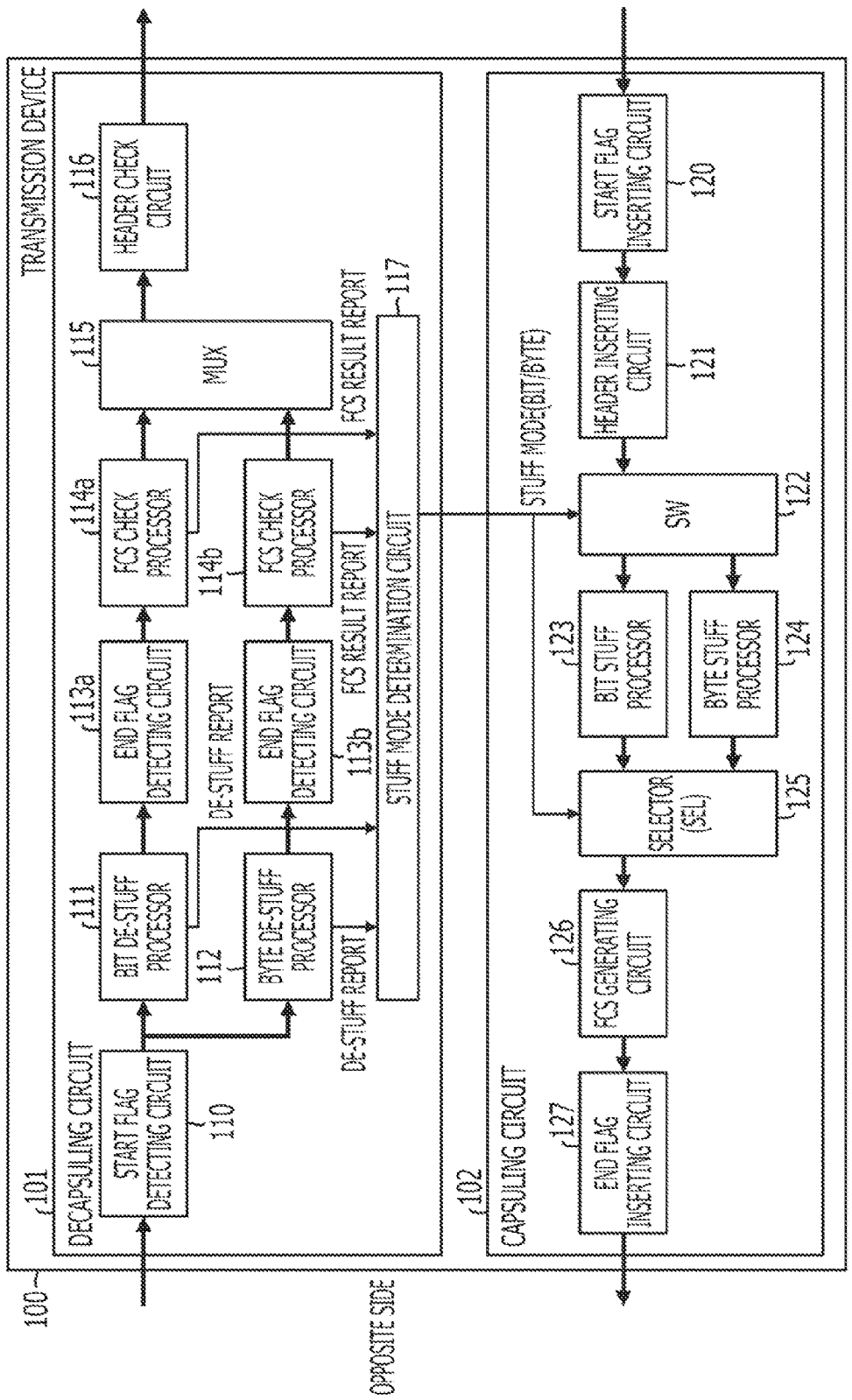
FIG. 1 is a block diagram illustrating an example of a transmission device.

FIG. 1 is a block diagram illustrating an example of a transmission device. A transmission device 100 includes a decapsuling circuit 101 and a capsuling circuit 102. The transmission device 100 may be operated by, for example, a processor. The decapsuling circuit 101 includes a start flag detecting circuit 110, a bit de-stuff processor 111, a byte de-stuff processor 112, end flag detecting circuits 113a and 113b, FCS check processors 114a and 114b, a multiplexer (MUX) circuit 115, a header check circuit 116, and a stuffing mode determination circuit 117.

The capsuling circuit 102 includes a start flag inserting circuit 120, a header inserting circuit 121, a switch (SW) 122, a bit stuff processor 123, a byte stuff processor 124, a selector (SEL) circuit 125, an FCS generating circuit 126, and an end flag inserting circuit 127. The above-described parts, which are included in the decapsuling circuit 101 and the capsuling circuit 102, are operated by an electric circuit, for example.

Regarding a reception signal from the opposite device, after the end of a SDH/Sonet layer and the end of a Path layer are processed, the reception signal is input into the decapsuling circuit 101. After a start flag is detected by the start flag detecting circuit 110, the decapsuling circuit 101 duplicates an input signal and inputs the input signals to the bit de-stuff processor 111 and the byte de-stuff processor 112, respectively. The bit de-stuff processor 111 and the byte de-stuff processor 112 may perform processing in parallel. The processed signals are output to the end flag detecting circuits 113a and 113b, respectively in a later stage. In the above-described de-stuff processing, if a code is converted, a "de-stuff report," which indicates a frame in which the code conversion is performed, is reported to the stuffing mode determination circuit 117.

The end flag detecting circuits 113a and 113b detect an end flag, respectively. The FCS check processors 114a and 114b calculate an FCS and compare the FCS to an FCS field positioned before the end flag to check a normality of the frame. The FCS check processors 114a and 114b report a result of FCS check as an "FCS result report" to the stuffing mode determination circuit 117. The FCS check processors 114a and 114b discard the frame in which an FCS error occurs and transfers the frame to the MUX circuit 115 in a later stage. If the MUX circuit 115 receives a frame either from the bit stuffing side or the byte stuffing side, the MUX circuit 115 transfers the frame to the header check circuit 116 without change. If the MUX circuit 115 receives the frames from both the bit stuffing side and the byte stuffing side, the MUX circuit 115 transfers one frame and discards the other frame. The header check circuit 116 checks the content of the header of the frame. If the frame is normal, the header check circuit 116 outputs the frame to the Ether/IP processor (not illustrated). If the frame is not normal, the header check circuit 116 discards the frame.

Based on the "de-stuff report" and the "FCS result report" from each de-stuffing mode, the stuffing mode determination circuit 117 determines that the de-stuffing mode in which "de-stuff report"="de-stuff performance," and "FCS result report"="FCS normal" are reported as a stuffing mode of the opposite device. The stuffing mode determination circuit 117 outputs a determination result of the stuffing mode to the SW 122 of the capsuling circuit 102 and the SEL circuit 125 and then changes the stuffing mode of the transmitting side.

For the frame in which the code conversion is not performed by the de-stuffing, both the de-stuffing methods may be performed to detect the frame that has the normal FCS. In this case, the stuffing mode determination circuit 117 allows either of the frames to be transmitted and does not perform determination of the de-stuffing mode of the opposite device.

With respect to the frame and/or packet received from the Ether/IP processor in a former stage (not illustrated), the capsuling circuit 102 inserts the start flag by using the start flag inserting circuit 120 and inserts the LAPS frame header by using the header inserting circuit 121. The SW 122 is switched, whether the bit stuff processor 123 or the byte stuff processor 124 to which a signal is output, according to a stuffing mode output from the stuffing mode determination circuit 117. The stuffing according to each mode of the bit stuff processing performed by the bit stuff processor 123 or the byte stuff processing performed by the byte stuff processor 124 are performed. The SEL circuit 125 transfers the output from the selected bit stuff processor 123 or byte stuff processor 124 to the FCS generating circuit 126. The FCS generating circuit 126 adds the FCS to the frame. The end flag inserting circuit 127 adds the end flag to the frame. The flags are output to a Path processor and an SDH/Sonet processor (not illustrated) provided in the opposite device.

Figure 2:
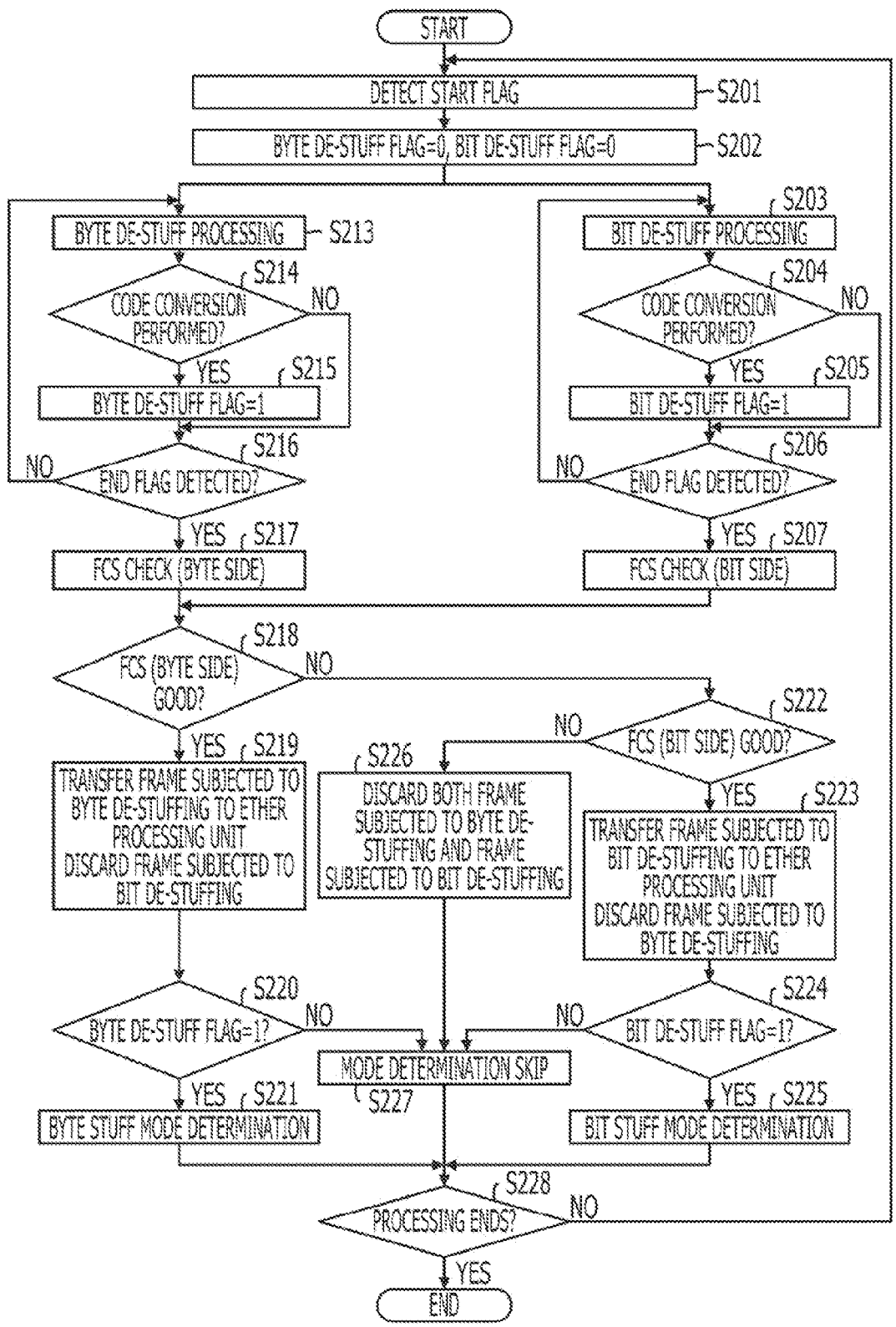
FIG. 2 is an example of a method of processing performed by a decapsuling circuit illustrated in FIG. 1.

FIG. 2 is a flowchart illustrating an example of processing performed by the decapsuling circuit 101 illustrated in FIG. 1. The reception signal from the opposite device is received by the decapsuling circuit 101. The start flag detecting circuit 110 of the decapsuling circuit 101 detects a start flag (Operation S201). The flag (bit de-stuff flag) in the bit de-stuff processor 111 and the flag (byte de-stuff Flag) in the byte de-stuff processor 112 are set to an initial value 0 (Operation S202). The start flag detecting circuit 110 duplicates an input signal and performs the bit de-stuff processing by the bit de-stuff processor 111 and the byte de-stuff processing by the byte de-stuff processor 112 in parallel.

The bit de-stuff processor 111 performs the bit de-stuff processing (Operation S203), and determines, by the bit de-stuff processing, whether the code is converted (Operation S204). If the code is converted (Yes in Operation S204), the bit de-stuff flag is set to 1 (Operation S205). The "bit de-stuff report," which indicates the frame in which the code conversion is performed, is reported to the stuffing mode determination circuit 117. If the code conversion is not performed (No in Operation S204), the process goes to Operation S206. In Operation S205, the end flag detecting circuit 113a detects the end flag. If the end flag is not detected (No in Operation S206), the process goes back to Operation S203, and the above-described processing is repeated. If the end flag is detected (Yes in Operation S206), the FCS check processor 114a calculates an FCS (Operation S207).

The byte de-stuff processor 112 performs the byte de-stuff processing (Operation S213) and determines, by the byte de-stuff processing, whether the code is converted (Operation S214). If the code is converted (Yes in Operation S214), the byte de-stuff Flag is set to 1 (Operation S215). The "byte de-stuff report," which indicates the frame in which the code conversion is performed, is reported to the stuffing mode determination circuit 117. If the code is not converted (No in Operation S214), the process goes to Operation S216. In Operation S215, the end flag detecting circuit 113b detects the end flag. If the end flag is not detected (No in Operation S216), the process goes back to Operation S213, and the above-described processing is repeated. If the end flag is detected (Yes in Operation S216), the FCS check processor 114b calculates the FCS (Operation S217).

The FCS check processors 114a and 114b perform the FCS check for the bit and the byte, respectively. Regarding the FCS check in the byte de-stuff processing, the FCS check processor 114b checks whether the frame is normal by comparing the calculated FCS to the FCS field positioned right before the end flag (Operation S218). At this time, the FCS check processor 114b reports an FCS check result as an "FCS result report" to the stuffing mode determination circuit 117. If the frame after being subjected to the byte de-stuffing is normal (Yes in Operation S218), the MUX circuit 115 transfers the frame to an Ether processor in a later stage and then discards the frame subjected to the bit de-stuffing (Operation S219). The stuffing mode determination circuit 117 determines whether the byte de-stuff Flag is set to 1 (Operation S220). If the byte de-stuff Flag is set to 1 (Yes in Operation S220), the stuffing mode is determined to be the byte stuffing mode (Operation S221). The process goes to Operation S228.

If the byte de-stuff Flag is not set to 1 (No in Operation S220), the process goes to Operation S227.

On the other hand, if the frame is not normal with respect to the byte de-stuffing (No in Operation S218), the FCS check result of the bit de-stuffing is determined. Based on the FCS check result from the bit de-stuff processing by the FCS check processor 114a, the normality of the frame is checked (Operation S222). At this time, the FCS check processor 114a reports the FCS check result as an "FCS result report" to the stuffing mode determination circuit 117. If the frame after being subjected to the bit de-stuffing is normal (Yes in Operation S222), the MUX circuit 115 transfers the frame to the Ether processor in the later stage and then discards the frame subjected to the byte de-stuffing (Operation S223). The stuffing mode determination circuit 117 determines whether or not the bit de-stuff flag is set to 1 (Operation S224). If the bit de-stuff flag is set to 1 (Yes in Operation S224), the stuffing mode determination circuit 117 determines that the mode is the bit stuffing mode (Operation S225). The process goes to Operation S228. If the bit de-stuff flag is not set to 1 (No in Operation S224), the process goes to Operation 227.

When the result from the determination in Operation S222 is not normal (No in Operation S222), both the results from the FCS check of either the byte de-stuffing or the bit de-stuffing are not normal. In this case, the MUX circuit 115 discards both the frame subjected to the byte de-stuffing and the frame subjected to the bit de-stuffing (Operation S226). The stuffing mode determination circuit 117 skips the stuffing mode determination (Operation S227). The process goes to Operation S228.

In Operation S228, until the end (Yes in Operation S228) of the processing (No in Operation S228), the process goes back to Operation S201 to update the frame, and the above-described processing on a next frame is repeated.

The stuffing mode determination circuit 117 may perform the stuffing mode determination every time a frame is received. Moreover, after the frame in which the code conversion is once performed by the de-stuffing and which has the normal FCS after the stuffing mode determination is performed after an alarm in a lower layer is cleared, the frame may not be changed regardless of reception of an FCS error if the alarm in the lower layer is not detected.

Figure 3:
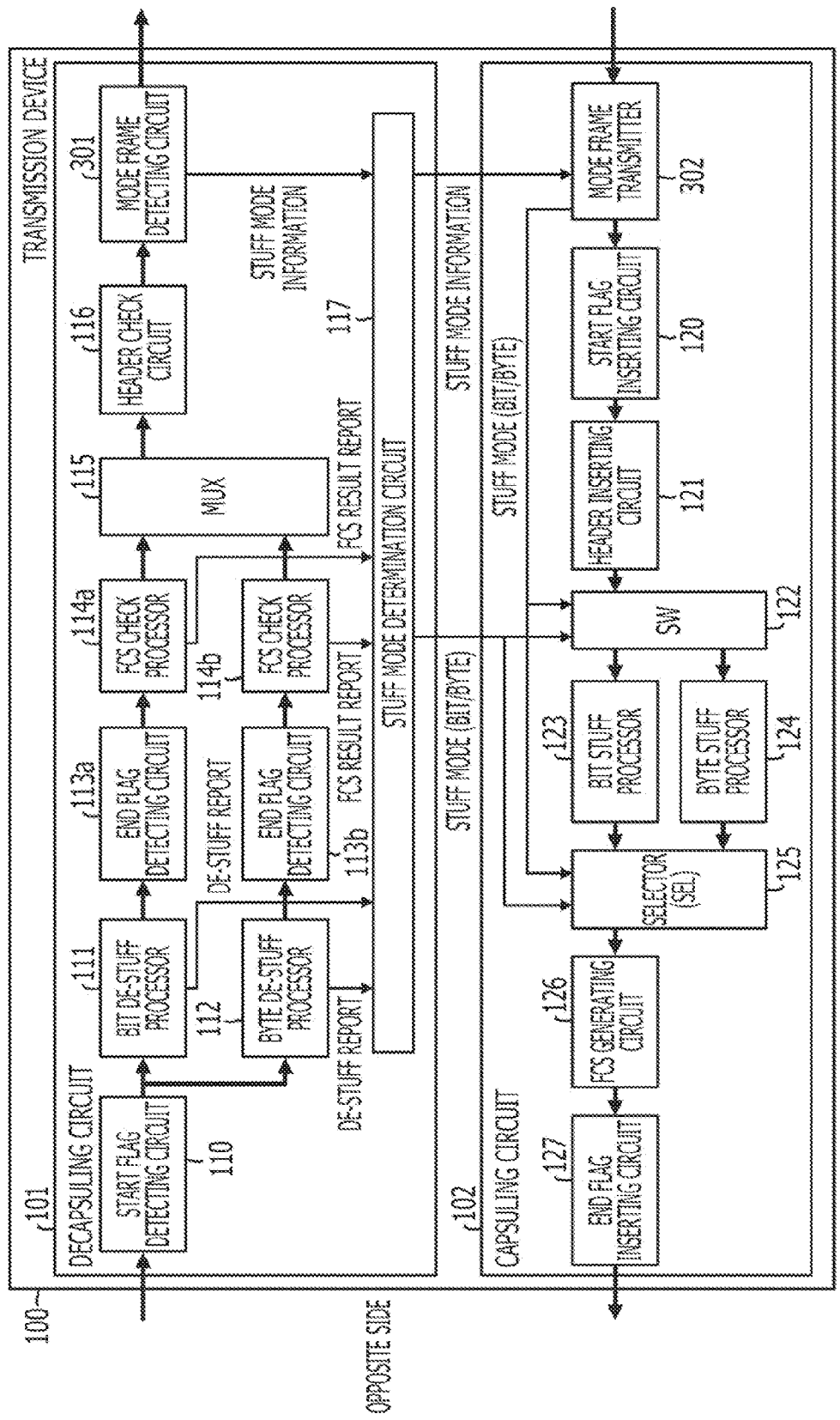
FIG. 3 is a block diagram illustrating another example of the transmission device.

FIG. 3 is a block diagram illustrating another example of the transmission device. In addition to the configuration illustrated in FIG. 1, the configuration illustrated in FIG. 3 adds a mode frame detecting circuit 301 to the decapsuling circuit 101 and adds a mode frame transmitter 302 to the capsuling circuit 102. The processing other than the processing by the mode frame detecting circuit 301 and the mode frame transmitter 302 are similar to the configuration illustrated in FIG. 1, so that the descriptions of the similar components are omitted. The transmission device 100 in FIG. 3 may be operated by, for example, a processor.

If the alarm in the lower layer is cleared, the mode frame transmitter 302 transmits, to the opposite device, a negotiation frame that includes information of desired stuffing and a check code that checks the normality of the information.

Figure 4:
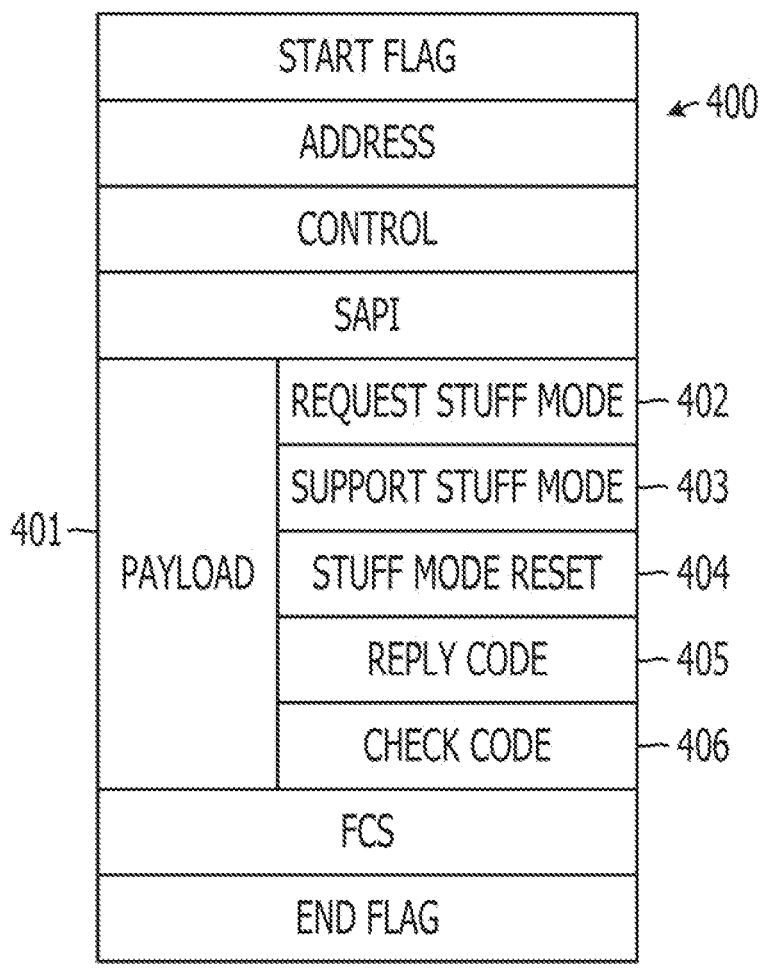
FIG. 4 is a diagram illustrating an example of data to be transmitted to an opposite device during negotiation.

FIG. 4 is a diagram illustrating an example of data to be transmitted to the opposite device during negotiation. During the negotiation with the opposite device, the mode frame transmitter 302 transmits a negotiation frame 400 illustrated in FIG. 4 to the opposite device. In the opposite device, the mode frame detecting circuit 301 detects the negotiation frame 400. The negotiation frame 400 includes a start flag, an address, a control, a Speech Application Programming Interface (SAPI), a payload 401, an FCS, and an end flag according to a general format. The negotiation frame 400 further includes data that reports a stuffing mode or the like to the payload.

The payload 401 includes a request stuffing mode 402 indicating a stuffing mode desired for the opposite device, a support stuffing mode 403 indicating the stuffing mode supported by the present device, a stuffing mode reset 404 that desires to reset the stuffing mode determination of the opposite device, a reply code 405 that replies acceptance or denial to a request from the opposite device, and a check code 406 that checks the normality of the information. The payload 401 may include some of the above described components. For example, the check code 406 may have a simple keyword or a configuration for calculating a Cyclic Redundancy Check (CRC) for the information area.

Examples indicate setting values of the above-described items. (1) request stuffing mode 402
  0x0001: byte stuffing mode
  0x0002: bit stuffing mode
  Others: reserve (2) support stuffing mode 403
  0x0001: byte stuffing mode Only
  0x0100: bit stuffing mode Only
  0x0101: byte & bit stuffing mode both
  Others: reserve (3) stuffing mode reset 404
  0x5555: mode reset request
  Others: nop (4) reply code 405
  0x0101: accept byte stuffing mode Request
  0x0102: accept bit stuffing mode Request
  0x0201: deny byte stuffing mode Request
  0x0202: deny bit stuffing mode Request
  Others: reserve (5) check code 406
  32 bit CRC check result regarding data range from request stuffing mode 402 to reply code 405

The mode frame transmitter 302 of the capsuling circuit 102 illustrated in FIG. 3 changes the stuffing mode after inputting a stuffing mode control signal into the SW 122 and the SEL circuit 125 through the stuffing mode determination circuit 117 when the negotiation frame 400 is transmitted. Accordingly, from among the negotiation frames 400, one frame is transmitted in the bit stuffing mode, and the other frame is transmitted in the Byte stuffing mode.

On the other hand, the mode frame detecting circuit 301 of the decapsuling circuit 101 determines that the frame is the negotiation frame 400 based on the check code 406 of the received frame and the information inside thereof, and reports the information to the stuffing mode determination circuit 117. The stuffing mode determination circuit 117 changes the stuffing mode based on the information. The information from the negotiation frame 400 is processed in preference to the stuffing mode that is determined by the "de-Stuff report" and the "FCS result report." If the stuffing mode is set by the request stuffing mode 402, the setting is reported to the mode frame transmitter 302. The report indicating that the stuffing mode is accepted by the reply code 405 of the negotiation frame 400 is sent to the opposite device. If the stuffing mode reset 404 receives a reset request, the stuffing mode is initialized. The detection of stuffing mode is again performed.

Figure 5:
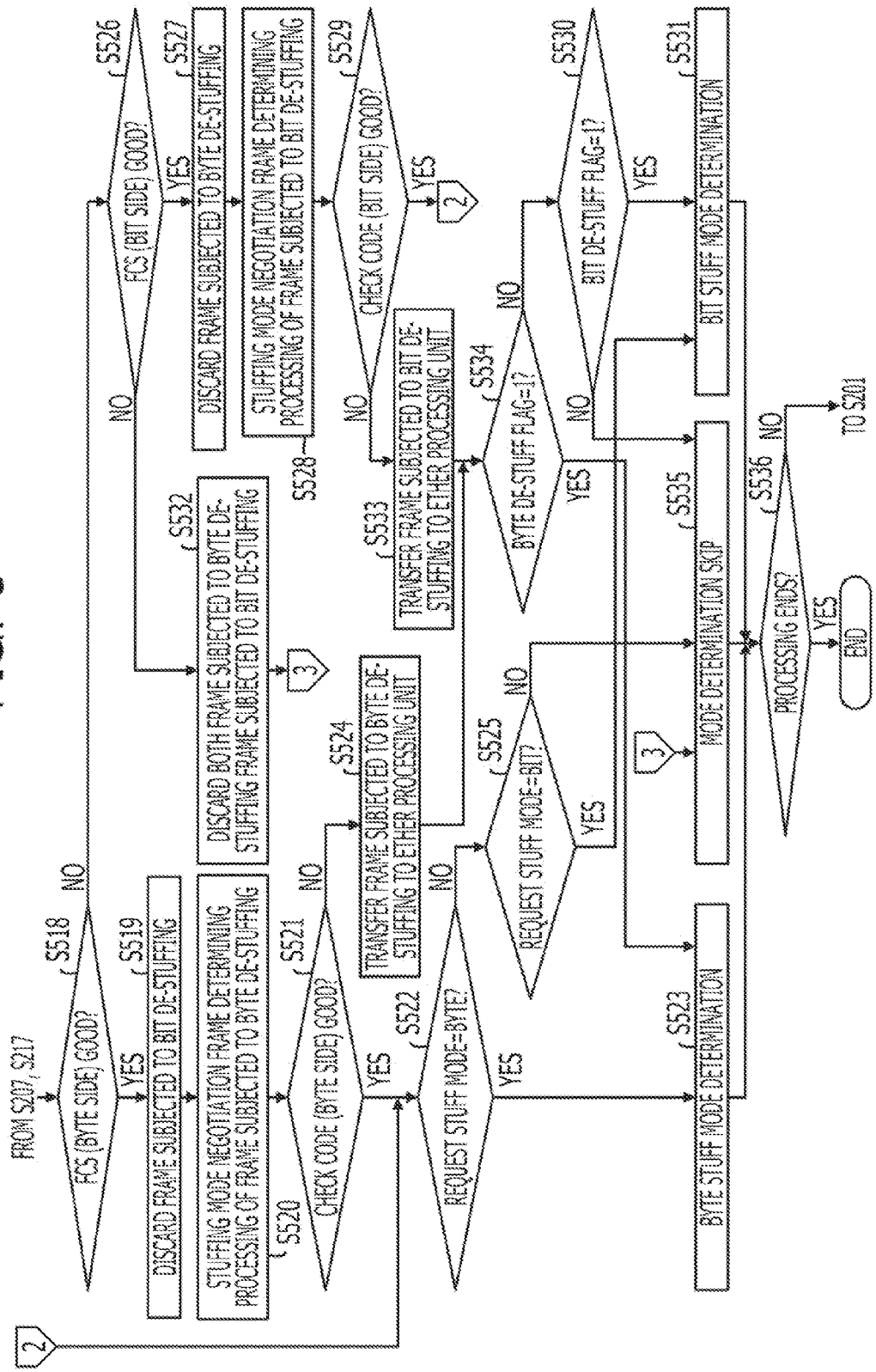
FIG. 5 is an example of a method of processing in the transmission device illustrated in FIG. 3.

FIG. 5 is an example of a method of processing performed by a transmission device illustrated in FIG. 3. The processing performed by the above-described mode frame transmitter 302 will be described. The process at the processing start (not illustrated in FIG. 5) is almost equivalent to Operation S201 to Operation S217. FIG. 5 illustrates the processing of Operation S207 illustrated in FIG. 2 and the processing of Operation S217 and the following operations.

After the processing in Operation S207 or Operation S217, the FCS check processors 114a and 114b perform the FCS check on the bit and the byte, respectively. For the FCS check on the byte de-Stuff processing side, the FCS check processor 114b compares the calculated FCS to the FCS Field positioned right before the end flag to check the normality of the frame (Operation S518). At this time, the FCS check processor 114b reports a result from the FCS check as the "FCS result report" to the stuffing mode determination circuit 117.

If the frame after being subjected to the byte de-stuffing is normal (Yes in Operation S518), the FCS check processor 114b discards the frame subjected to bit de-stuffing (Operation S519). The FCS check processor 114b performs determining processing of the negotiation frame 400 of the frame subjected to the byte de-stuffing (Operation S520). If the result of the check code 406 on the byte stuffing side is normal (Yes in Operation S521), a determination is performed to determine whether the request stuffing mode 402 is set to the byte (Operation S522). If the result is the byte (Yes in Operation S522), the stuffing mode determination circuit 117 determines that the mode is the byte stuffing mode (Operation S523). The process goes to Operation S536.

In Operation S521, if the result of the check code 406 on the byte stuffing side is not normal (No in Operation S521), the frame subjected to the byte de-stuffing is transferred to the Ether processor (not illustrated) in the later stage (Operation S524).

The process goes to Operation S534.

In Operation S522, if the request stuffing mode 402 is not set to the byte (No in Operation S522), a determination is performed to determine whether the request stuffing mode 402 is set to the bit (Operation S525). If the request stuffing mode 402 is set to the bit (Yes in Operation S525), the stuffing mode determination circuit 117 determines that the mode is the bit stuffing mode (Operation S531). The process goes to Operation S536. If the request stuffing mode 402 is not set to the bit in Operation S525 (No in Operation S525), the process goes to the processing of Operation S535 described below.

On the other hand, according to the FCS check in Operation S518, if the frame is not normal with respect to the byte de-stuffing (No in Operation S518), the FCS check result of the bit de-stuffing is determined. The FCS check processor 114a checks whether the frame is normal based on the FCS check result from the bit de-stuff processing (Operation S526). At this time, the FCS check processor 114a reports the result of the FCS check as the "FCS result report" to the stuffing mode determination circuit 117. If the frame after being subjected to the bit de-stuffing is normal (Yes in Operation S526), the MUX circuit 115 discards the frame subjected to the byte de-stuffing (Operation S527). The MUX circuit 115 performs the determining processing of the negotiation frame 400 of the frame subjected to the bit de-stuffing (Operation S528). If the result of the check code 406 on the bit stuffing side is normal (Yes in Operation S529), the processing following Operation S522 is performed.

If the result of determination in Operation S526 is not normal (No in Operation S526), the results from the FCS check of the byte de-stuffing and the bit de-stuffing are not normal. In this case, the MUX circuit 115 discards both the frame subjected to the byte de-stuffing and the frame subjected to the bit de-stuffing (Operation S532).

The process goes to Operation S535.

If the result of the check code 406 on the bit stuffing side is not normal (No in Operation S529), the frame subjected to the bit de-stuffing is transferred to the Ether processor (not illustrated) (Operation S533). The process goes to Operation S534.

In Operation S534, a determination is performed to determine whether the byte de-stuff flag is set to 1 (Operation S534). If yes (Yes in Operation S534), the process goes to Operation S523 described above. If no (No in Operation S534), a determination is performed to determine whether the bit de-stuff flag is set to 1 (Operation S530). If yes (Yes in Operation S530), the process goes to Operation S531. If no (No in Operation S530), the process goes to Operation S535.

In Operation S535, the stuffing mode determination circuit 117 skips the stuffing mode determination (Operation S535). The process goes to Operation S536.

In Operation S536, until the end (Yes in Operation S536) of the processing (No in Operation S536), the process goes back to Operation S201 (see FIG. 2) to update the frame, and the above-described processing on the next frame is repeated.

Figure 6:
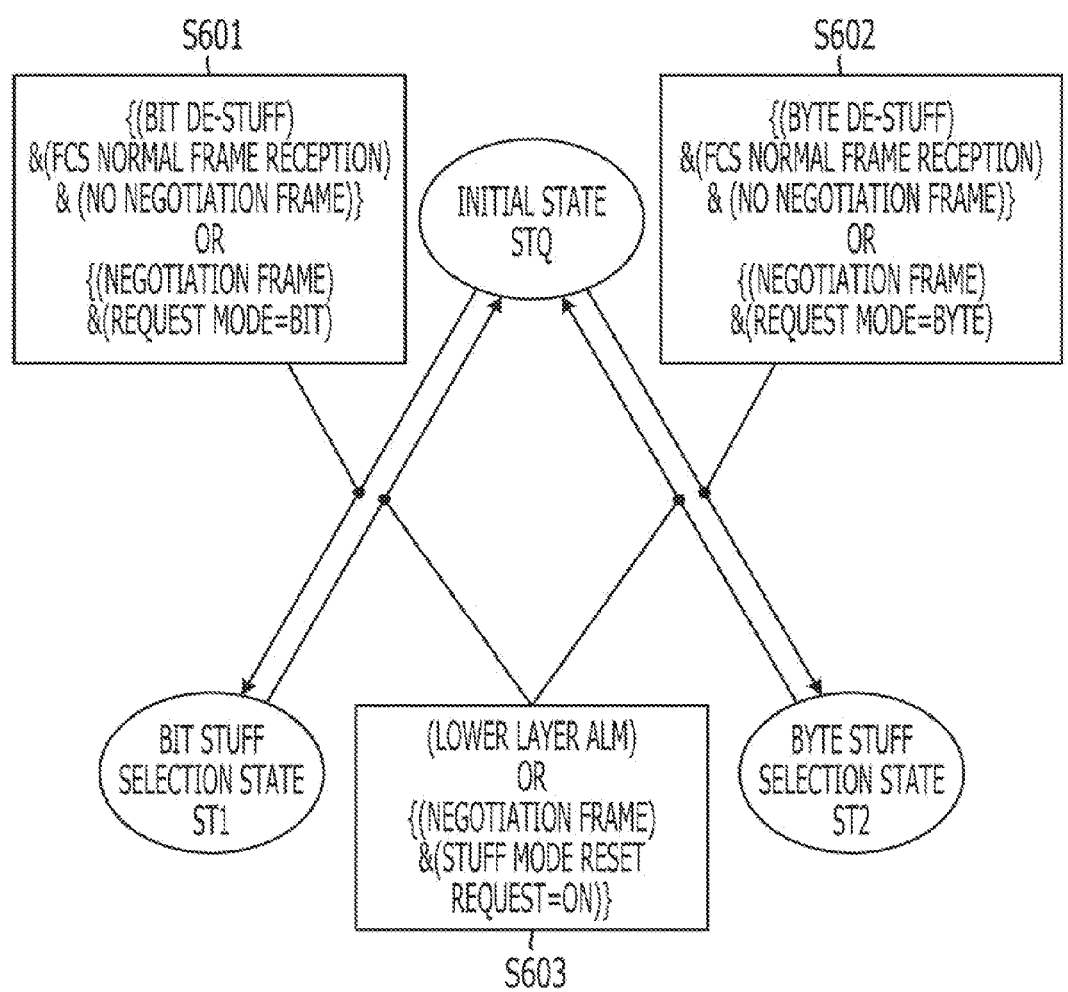
FIG. 6 is a diagram illustrating an example of a state transition of a stuffing mode of a transmission device.

FIG. 6 is a diagram illustrating an example of a state transition of a stuffing mode of a transmission device. There are three types of states: an initial state ST0, a bit stuff selection state ST1, and a byte stuff selection state ST2. A transition from the initial state ST0 to the bit stuff selection state ST1 is made if the transmission device 100 has a bit de-stuffing function, receives the frame that has the normal FCS from the opposite device, and does not receive the negotiation frame 400 from the opposite device (Operation S601). Alternatively, if the transmission device 100 receives the negotiation frame 400 from the opposite device, the transition is preferentially made when the request stuffing mode 402 is set to the bit stuff.

The transition from the initial state ST0 to the Byte Stuff selection state ST2 is made if the transmission device 100 has the byte de-stuffing function, receives the frame that has the normal FCS from the opposite device, and does not receive the negotiation frame 400 from the opposite device (Operation S602). Alternatively, if the transmission device 100 receives the negotiation frame 400 from the opposite device, the transition is preferably made when the request stuffing mode 402 is set to the Byte Stuff.

The state may be transited to the initial state ST0 from the bit stuff selection state ST1. Furthermore, the transition may be made if the alarm in the lower layer or the negotiation frame 400 is received and if the stuffing mode reset 404 is set to mode reset request (Operation S603).

The state may be transited to the initial state ST0 from the byte stuff selection state ST2. Furthermore, at this time, the transition is made if the alarm in the lower layer or the negotiation frame 400 is received and if the stuffing mode reset 404 is set to mode reset request (Operation S603).

Figure 7:
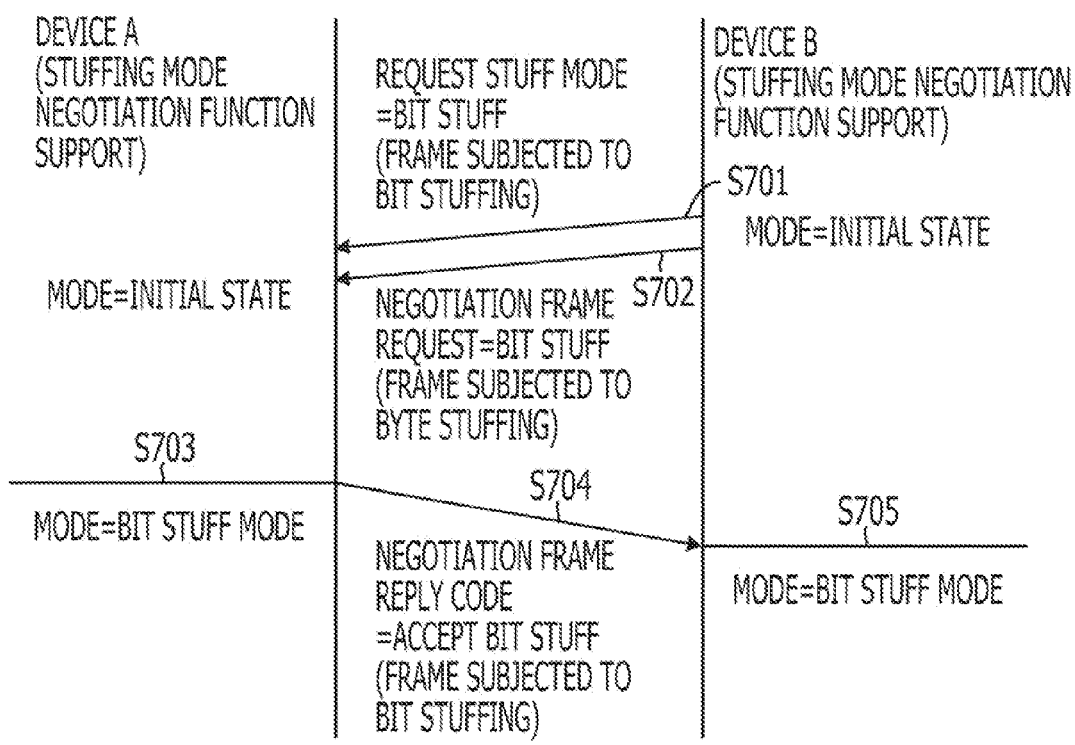
FIG. 7 is a sequence diagram illustrating an example of negotiation with an opposite device.

FIG. 7 is a sequence diagram illustrating an example of negotiation with an opposite device. In FIG. 3, a transmission device indicates a device A, and a transmission device on the opposite side indicates a device B. Both the device A and the device B are assumed to support the above-described stuffing mode negotiation function.

The negotiation frame 400 transmitted from the device B on the opposite side is detected by the mode frame detecting circuit 301. At this time, regarding the device B, the setting of the request stuffing mode 402 is the bit stuff (Operation S701) and the byte stuff (Operation S702). The mode frame transmitter 302 transmits one frame subjected to the bit stuffing and one frame subjected to the byte stuffing to the device A. In this case, the device A changes the stuffing mode from the initial state to a stuffing mode that is applicable (Operation S703). In this case, since the request stuffing mode 402 is set to the bit stuff, the stuffing mode determination circuit 117 of the device A is changed to the bit stuff state.

The mode frame transmitter 302 of the device A sets the reply code 405 of the negotiation frame 400 to Accept bit stuffing mode request and transmits the frame subjected to the bit stuffing to the device B on the opposite side (Operation S704). The mode frame detecting circuit 301 of the device B receives accept bit stuffing mode request of the reply code 405 of the negotiation frame 400, and the stuffing mode determination circuit 117 changes the stuffing mode from the initial state to the bit stuffing mode (Operation S705).

If the frame does not include '0x7E' or '0b11111' in the payload 401 illustrated in FIG. 4 and is not typically subjected to the stuffing, the result of byte stuffing matches the result of bit stuffing. Therefore, the frames subjected to the byte stuffing and the bit stuffing processing are not typically transmitted separately. However, there is a frame that includes '0b11111' in the LAPS header and the HDLC header most of the time. Therefore, the frame has a function for transmitting by both the byte stuffing and the bit stuffing.

Figure 8:
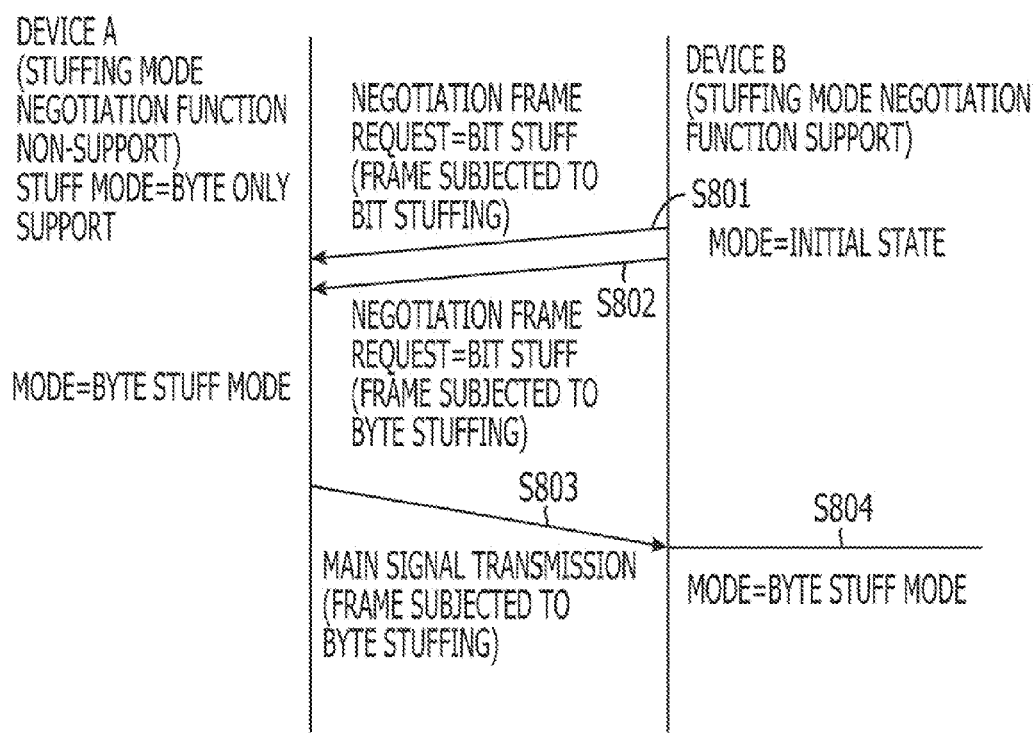
FIG. 8 is a sequence diagram illustrating another example of the negotiation with the opposite device.
Figure 9:
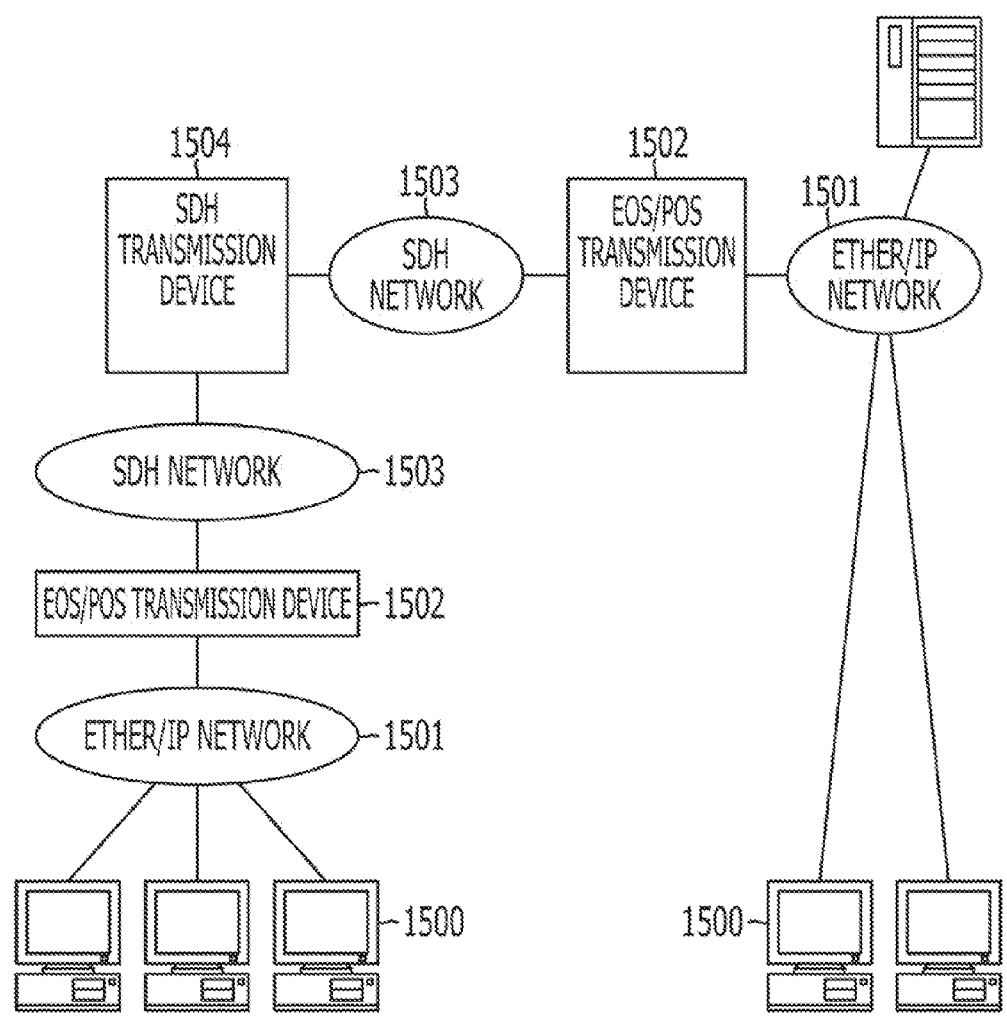
FIG. 9 is a diagram illustrating an example of a network that includes a transmission device that capsules a frame.

FIG. 8 is a sequence diagram illustrating another example of negotiation with an opposite device. The transmission device illustrated in FIG. 3 indicates the device B. The device B supports the above-described stuffing mode negotiation function. On the other hand, the device A is a conventional device that includes the byte stuffing function and does not support the stuffing mode negotiation function.

The device B in the initial state transmits the negotiation frame 400 to the device A. At this time, as for the device B, the request stuffing mode 402 is set to the bit stuffing (Operation S801) and the byte stuffing (Operation S802), and the device B transmits the frame subjected to the bit stuffing and the frame subjected to the byte stuffing to the device A.

However, since the content of the payload 401 of the negotiation frame 400 is not normal, the device A does not recognize the negotiation frame 400. The device A receives the frame by the byte stuffing function.

The device A receives the frame by the byte stuffing function of the device A with respect to the device B (Operation S803). The device B recognizes that the mode frame detecting circuit 301 has the byte stuffing mode and changes the mode from the initial state to the byte stuffing mode (Operation S804).

Accordingly, the device B, which has a plurality of stuffing modes, may transmit and receive a frame to and from the conventional device A with no trouble. Since the Ether processor in the later stage of the device A (or the IP processor) discards the negotiation frame 400 as an error frame, the negotiation frame 400 does not affect other communication.

As described above, by transmitting and receiving the frame that includes the information desired as a stuffing mode to and from the opposite device, the stuffing mode may be matched between the device and the opposite device. If the normal FCS is detected, by the stuff determination, the stuffing mode may be matched between the devices with the above-described configuration or between the device with the above-described configuration and a conventional device.

The decapsuling circuit 101 checks the payload 401 of the frame subjected to the de-stuffing. If the check code 406 in the payload 401 is correct, the decapsuling circuit 101 reads out stuff information (the request stuffing mode 402) desired by the opposite device and then reports the information to the capsuling circuit 102. The capsuling circuit 102 changes the stuffing mode to the desired stuffing mode. If the payload 410 does not include the information related to the check code 406 or the desired stuffing mode, the mode is determined to be the stuffing mode, which is subjected to the bit stuffing or the byte stuffing, with the normal FCS.

According to the information in the received frame, the decapsuling circuit 101 reports the setting of the stuffing mode of the present device to the opposite device, so that the present device and the opposite device may mutually check mismatching of the stuffing mode. By the function for transmitting the frame that desires initialization of the stuffing mode determination to the opposite device, the stuffing mode of the opposite device may be changed without operating the opposite device or the like when the stuffing mode of the present device is changed.

As described above, according to the disclosed technique, the bit stuff processing and the byte stuff processing on the input data are performed in parallel, and the opposite device may determine that the stuff processing of the normal result from among the FCS results of the stuff processing has the stuffing mode in which the opposite device receives the data. Accordingly, the data may be received normally even if the stuffing mode of the opposite device is unknown. The transmission frame is described in the above-described example. The transmission packet is applicable in the similar way. The above-described transmission device is applicable to a transmission device that performs capsuling/decapsuling of a frame and/or a packet by Link Access Procedure for SDH (LAPS) or High-Level Data Link Control (HDLC).

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A transmission device which capsules and decapsules data of any one of a frame and a packet comprises a decapsuling circuit, wherein the decapsuling circuit comprises:
    a bit de-stuff processor configured to perform bit de-stuffing processing on an input data;
    a byte de-stuff processor configured to perform byte de-stuffing processing on duplicated data of the input data;
    a check processor configured to perform frame check sequence (FCS) processing on output from the bit de-stuff processor and the byte de-stuff processor; and
    a mode determination circuit configured to determine a stuffing mode of an opposite transmission device, based on a code conversion result from the bit de-stuff processor and the byte de-stuff processor and the stuffing mode in which the check processor detects the input data with a normal FCS.

2. The transmission device according to claim 1, further comprising:
    a capsuling circuit configured to capsule an output data to be transmitted to the opposite transmission device,
    wherein the mode determination circuit reports the determined stuffing mode of the opposite transmission device, and
    wherein the capsuling circuit transmits the output data in the stuffing mode which is determined by the mode determination circuit.

3. The transmission device according to claim 2, wherein the capsuling circuit comprises information related to the stuffing mode requested to the opposite transmission device and a mode frame transmitter which transmits the output data which includes a check code indicating a normality of the stuffing mode information.

4. The transmission device according to claim 3, wherein the mode frame transmitter inserts the information related to the stuffing mode into any one of a frame and a payload of a packet.

5. The transmission device according to claim 3, wherein the mode frame transmitter performs stuffing on the output data by byte stuffing and bit stuffing, respectively and transmits the output data to the opposite transmission device.

6. The transmission device according to claim 1, wherein the capsuling circuit comprises a mode frame detecting circuit which detects a check code indicating a normality of information related to the requested stuffing mode and of the stuffing mode information, and
   wherein the mode determination circuit determines the stuffing mode of an opposite transmission device detected by the mode frame determination circuit to control a change of the capsuling circuit to the stuffing mode.

7. The transmission device according to claim 5, wherein if the stuffing mode is changed according to the stuffing mode requested by the opposite transmission device, the mode frame transmitting circuit reports the information related to the changed stuffing mode to the opposite transmission device.

8. The transmission device according to claim 5, wherein the mode frame transmitting circuit reports a request for initializing determination of the stuffing mode.

9. A transmitting method of a transmission device which capsules and decapsules data of any one of a frame and a packet, the transmitting method comprising:
   performing bit de-stuffing processing on input data;
   performing byte de-stuffing processing on duplicated data of the data;
   performing frame check sequence (FCS) processing on an output of the bit de-stuffing process and the byte de-stuffing process, respectively; and
   determining a stuffing mode of an opposite transmission device by a code conversion result in the bit de-stuffing process and the byte de-stuffing process, and by the stuffing mode on a side where the data with a normal FCS detected by the FCS check process.

* * * * *